United States Patent
Park

(10) Patent No.: US 7,437,186 B2
(45) Date of Patent: Oct. 14, 2008

(54) SLIDING MODULE FOR SLIDING-TYPE PORTABLE TERMINAL AND SLIDING-TYPE PORTABLE TERMINAL USING THE SAME

(75) Inventor: Ji-Won Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 636 days.

(21) Appl. No.: 11/177,122

(22) Filed: Jul. 8, 2005

(65) Prior Publication Data

US 2006/0128449 A1    Jun. 15, 2006

(30) Foreign Application Priority Data

Dec. 6, 2004    (KR) .................... 10-2004-0101818

(51) Int. Cl.
   *H04M 1/00*    (2006.01)
(52) U.S. Cl. ............................. 455/575.4; 379/433.12; 455/573; 455/575.1
(58) Field of Classification Search ............... 455/575.4
   See application file for complete search history.

(56) References Cited

U.S. PATENT DOCUMENTS

| | | | | |
|---|---|---|---|---|
| 5,564,078 | A * | 10/1996 | Nagai ....................... | 455/575.3 |
| 5,956,625 | A * | 9/1999 | Hansen et al. ............. | 455/575.4 |
| 6,208,874 | B1 * | 3/2001 | Rudisill et al. ............ | 455/575.4 |
| 6,370,362 | B1 * | 4/2002 | Hansen et al. ............. | 455/90.1 |
| 6,463,262 | B1 * | 10/2002 | Johnson et al. ............ | 455/90.1 |
| 6,470,175 | B1 * | 10/2002 | Park et al. .................. | 455/90.1 |
| 6,842,626 | B1 * | 1/2005 | Kubo et al. ................ | 455/550.1 |
| 6,961,593 | B1 * | 11/2005 | Lonka et al. ................ | 455/573 |
| 7,158,818 | B2 * | 1/2007 | Lee .......................... | 455/575.4 |
| 7,242,165 | B2 * | 7/2007 | Lee et al. .................... | 320/115 |
| 7,331,516 | B2 * | 2/2008 | Hwang et al. ............... | 235/380 |
| 7,353,052 | B2 * | 4/2008 | Yamasaki ................... | 455/575.4 |
| 2004/0157653 | A1 * | 8/2004 | Kato ........................ | 455/575.4 |
| 2004/0224732 | A1 * | 11/2004 | Lee et al. .................... | 455/575.3 |
| 2005/0049016 | A1 * | 3/2005 | Cho et al. ................... | 455/575.1 |
| 2005/0078443 | A1 * | 4/2005 | Lee et al. .................... | 361/683 |
| 2005/0107137 | A1 * | 5/2005 | Byun et al. ................. | 455/575.1 |
| 2005/0122669 | A1 * | 6/2005 | Lee ............................ | 361/679 |
| 2005/0124397 | A1 * | 6/2005 | Yamasaki .................. | 455/575.4 |
| 2005/0187024 | A1 * | 8/2005 | Cho et al. ................... | 463/46 |
| 2005/0215298 | A1 * | 9/2005 | Lee .......................... | 455/575.4 |
| 2005/0265545 | A1 * | 12/2005 | Lonka et al. ............ | 379/433.08 |
| 2005/0274786 | A1 * | 12/2005 | Hwang et al. ............ | 235/145 R |
| 2006/0030381 | A1 * | 2/2006 | Byun et al. ................. | 455/575.4 |
| 2006/0109980 | A1 * | 5/2006 | Miyazaki ................. | 379/433.12 |
| 2006/0120029 | A1 * | 6/2006 | Ryu et al. ................... | 361/680 |
| 2006/0205450 | A1 * | 9/2006 | Amano et al. ............. | 455/575.4 |
| 2008/0096619 | A1 * | 4/2008 | Kuga et al. ................ | 455/575.4 |

* cited by examiner

*Primary Examiner*—Matthew Anderson
*Assistant Examiner*—Hai V Nguyen
(74) *Attorney, Agent, or Firm*—The Farrell Law Firm, PC

(57) ABSTRACT

Disclosed is a sliding module for a sliding-type portable terminal having a pair of sliding rail modules adapted to slide the sliding housing of the terminal along a curved path. The sliding module includes a main housing extending along a longitudinal direction, a sliding housing adapted to slide along a curve in the longitudinal direction toward or away from the main housing, and a pair of sliding rail modules positioned on both sides of the housings to couple the sliding housing to the main housing in such a manner that the sliding housing can slide from the main housing along a curve in the longitudinal direction and to expose and hide predetermined regions of the upper surfaces of the housings.

24 Claims, 22 Drawing Sheets

SLIDING MODULE FOR SLIDING-TYPE PORTABLE TERMINAL AND SLIDING-TYPE PORTABLE TERMINAL USING THE SAME

PRIORITY

This application claims priority to an application entitled "Sliding Module for Sliding-type Portable Terminal and Sliding-type Portable Terminal Using the Same" filed with the Korean Intellectual Property Office on Dec. 6, 2004 and assigned Serial No. 2004-101818, the contents of which are hereby incorporated by reference.

BACKGROUND OF THE INVENTION

1. Field of the Invention

The present invention relates to a sliding-type portable terminal with a sliding module that slides on a pair of sliding rail modules adapted to slide the housing of the terminal along a curve.

2. Description of the Related Art

In general, a "portable communication apparatus" is an apparatus for wireless communication. Portable communication apparatuses may be classified into various categories according to their appearance, such as bar-type terminals, flip-type terminals, and folder-type terminals. The bar-type terminals have a single housing shaped like a bar. The flip-type terminals have a flip that is rotatably coupled to a bar-shaped housing by a hinge device. The folder-type terminals have a folder which is connected to a single bar-shaped housing by a hinge device in such a manner that the folder can be rotated to fold onto, or unfold from, the housing.

In addition, portable communication apparatuses may be classified into rotation-type terminals and sliding-type terminals according to the mechanical opening and closing of the terminals. Rotation-type terminals have two housings coupled to each other so that one housing rotates to be opened or closed in relation to the other while facing each other. In the sliding-type terminals, two housings are coupled to each other so that one housing slides along a longitudinal direction to be opened or closed in relation to the other. These variously classified portable communication apparatuses can be easily understood by those skilled in the art.

As shown in FIGS. 1 to 5, a conventional sliding-type portable terminal 1 includes a main body 2 having a number of keypads 2a and a microphone device 2b and a sliding body 3 adapted to slide a distance corresponding to a half of the length of the main body 2 downward or upward open. The main body 2 generally has a 3×4 keypad array. The sliding body 3 has an auxiliary keypad made up of an array of a number of auxiliary keys, a speaker device 3a, and a display device 3b, all of which are positioned on the front surface thereof.

More particularly, the conventional siding-type portable terminal 1 includes a main body 2, a sliding body 3 adapted to slide a predetermined distance on the main body 2, guide means 4 positioned within the main body 2 and the sliding body 3 to guide the sliding body 3 on the main body 2, and at least one coil spring 5 positioned between the sliding body 3 and the main body 2 to provide an elastic force for the upward and downward sliding movement of the sliding body 3.

The main body 2 has a plate-shaped main plate 2c and the sliding body 3 has a plate-shaped sliding plate 3c as shown in FIGS. 3 and 4.

The guide means 4 include guide ribs 4a positioned on both sides of the plate-shaped sliding plate 3c and guide slots 4b positioned on the plate-shaped main plate 2c to be coupled to the guide ribs 4a.

However, conventional sliding-type portable terminals, such as that shown in FIGS. 1 to 4 are problematic in that, when the sliding body is slid from the main body, the main body and the sliding body are arranged in a step-like manner (i.e., there is a difference in level between the main body and the sliding body). Therefore, a user cannot simultaneously press the keys on the main body and the auxiliary keys on the sliding body, making the terminal less user friendly. Furthermore, increased thickness of the terminals is an obstacle to manufacturing a slim terminal.

When the conventional sliding-type portable terminals are used to play games or other additional functions, the auxiliary keys on the sliding body may be erroneously operated while pressing the main body keys because of the level difference between the keys.

SUMMARY OF THE INVENTION

Accordingly, the present invention has been made to solve the above-mentioned problems occurring in the prior art, and an object of the present invention is to provide a sliding-type portable terminal with a sliding module having a pair of sliding rail modules adapted to slide the sliding housing of the terminal along a curve for easy sliding opening/closing operation of the terminal.

Another object of the present invention is to provide a sliding-type portable terminal with a sliding module having a pair of sliding rail modules adapted to slide the sliding housing of the terminal along a curve in such a manner that the housings can be arranged next to each other on the same plane, as in the case of a bar-type terminal, for easy operation of the keys on the terminal.

Another object of the present invention is to provide a sliding module for a sliding-type portable terminal having a pair of sliding rail modules positioned on the sides of the terminal to slide the sliding housing of the terminal along a curve in order to reduce the thickness of the terminal for slimness of the product.

Another object of the present invention is to provide a sliding-type portable terminal with a sliding module having a number of variable sliding modules adapted to slide the sliding housing of the terminal along a curve for easy sliding opening/closing operation of the terminal.

To accomplish this object, there is provided a sliding module for a sliding-type portable terminal including a main housing extending along a longitudinal direction, a sliding housing adapted to slide along a curve in the longitudinal direction toward or away from the main housing, and a pair of sliding rail modules positioned on both sides of the housings to couple the sliding housing to the main housing in such a manner that the sliding housing can slide from the main housing along a curve in the longitudinal direction and to expose and/or hide predetermined regions of the upper surfaces of the housings side by side.

In accordance with another aspect of the present invention, there is provided a sliding module for a sliding-type portable terminal including a main housing extending along a longitudinal direction, a sliding housing adapted to slide along a curve in the longitudinal direction toward or away from the main housing, and a number of variable sliding modules positioned on both sides of the housings to couple the sliding housing to the main housing in such a manner that the sliding housing can slide from the main housing along a curve in the longitudinal direction and adapted to rotate about a number of hinge axes according to the sliding and travel a predetermined length so that the upper surfaces of the housings are exposed and/or hidden side by side.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
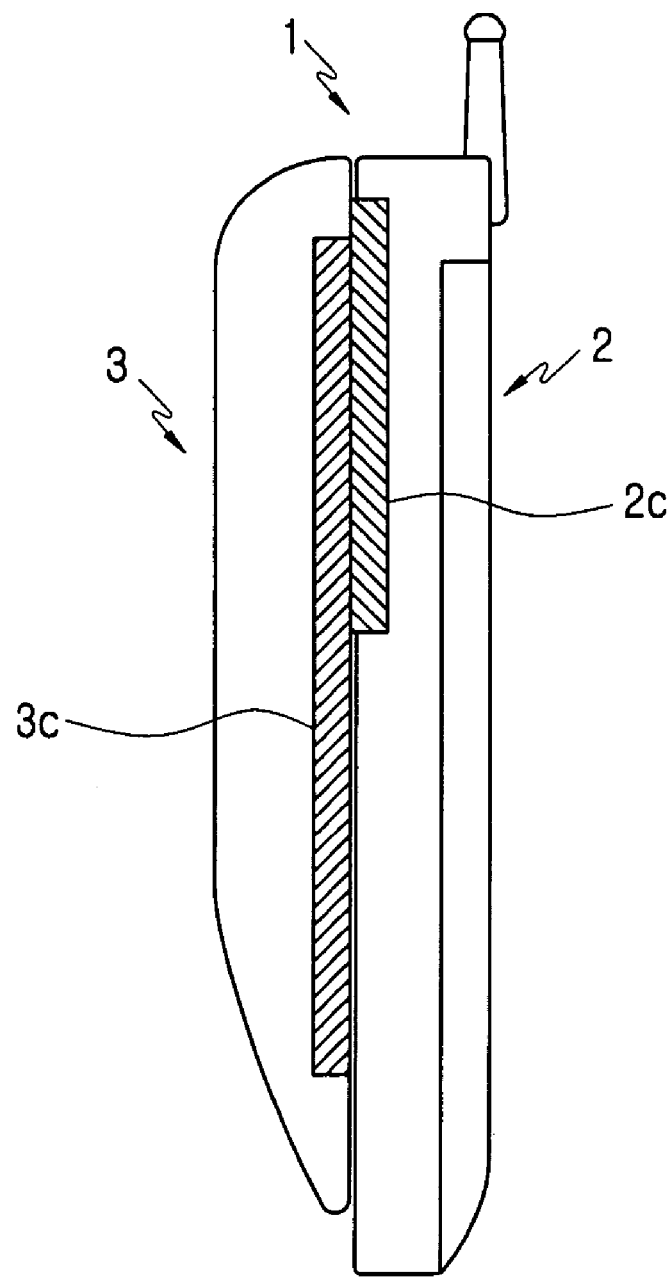
FIG. 1 is a lateral sectional view showing a conventional sliding-type portable terminal prior to operation.
Figure 2:
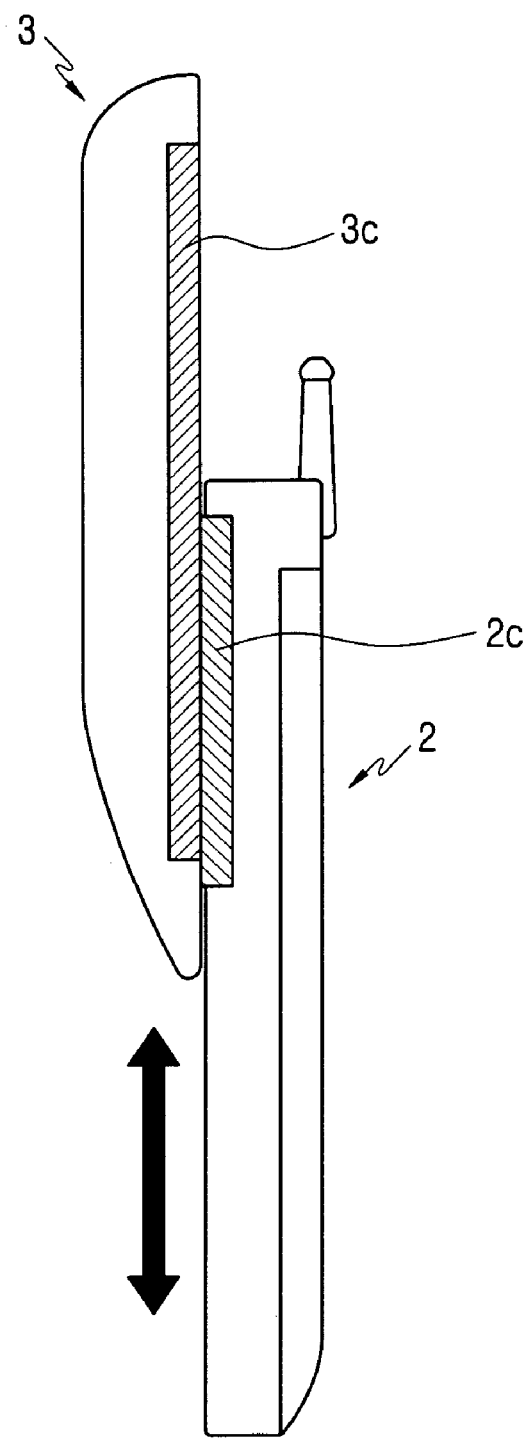
FIG. 2 is a lateral sectional view of the sliding-type portable terminal of FIG. 1 after operation.
Figure 3:
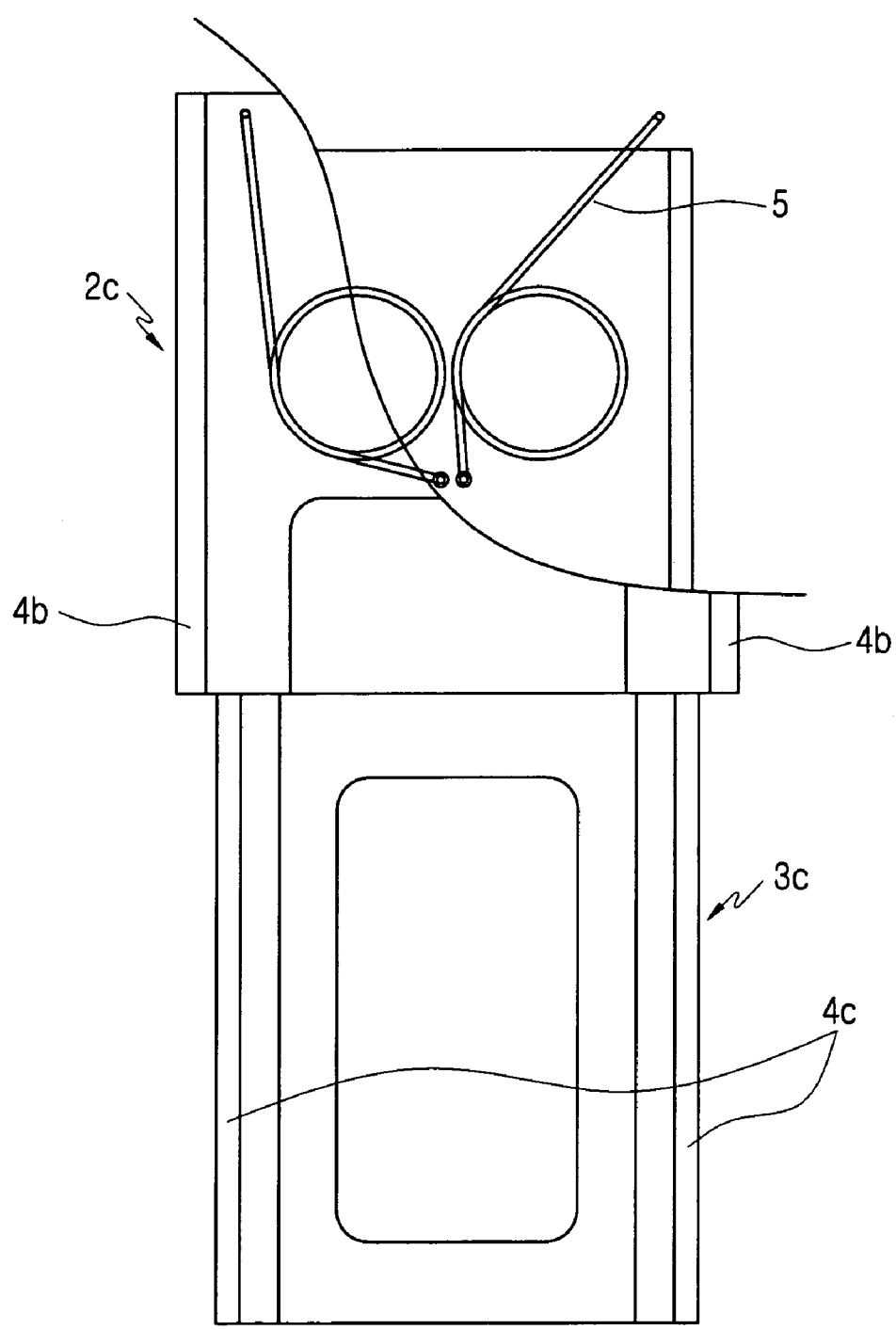
FIG. 3 is a front view showing a main plate, a sliding plate, and a driving spring of the sliding-type portable terminal of FIG. 1.
Figure 4:
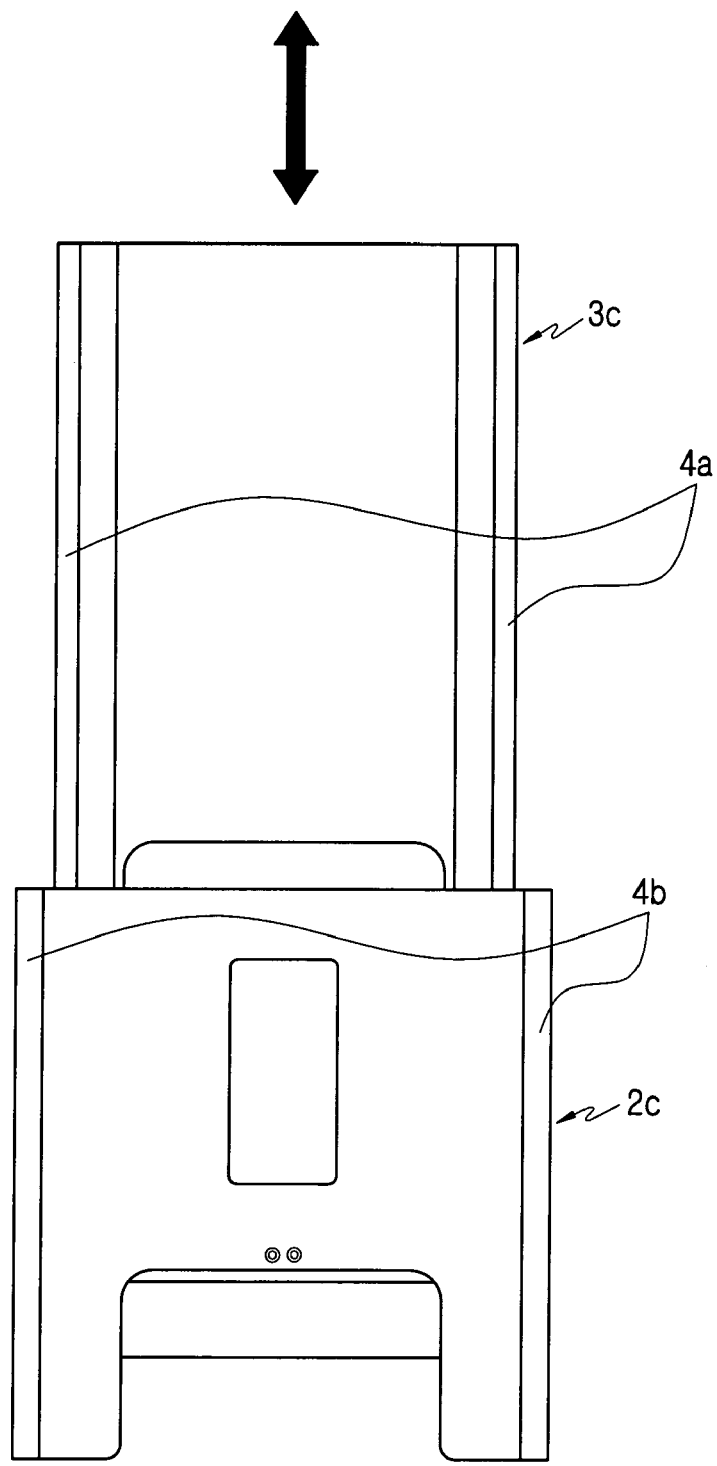
FIG. 4 is a front view showing a main plate and a sliding plate of the sliding-type portable terminal of FIG. 2.
Figure 5:
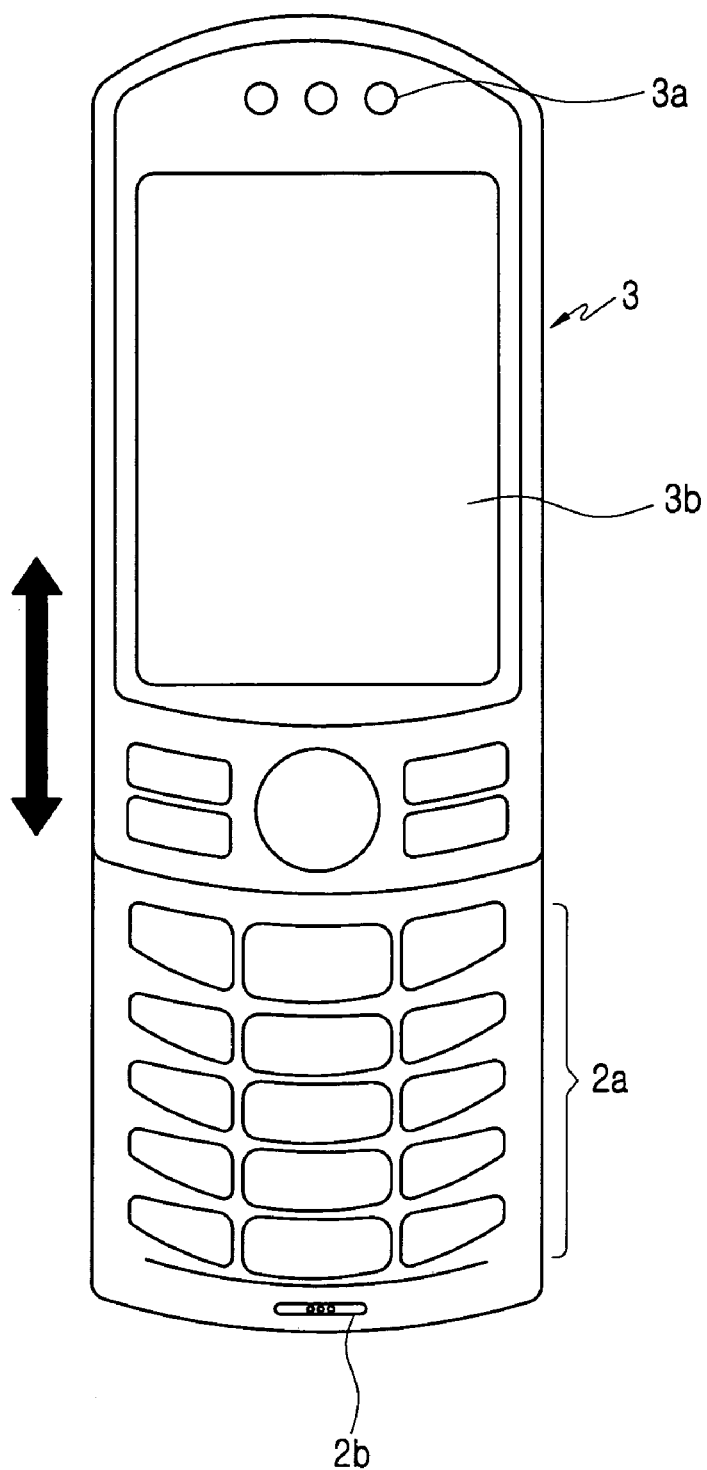
FIG. 5 is a front view showing a sliding housing of a conventional sliding-type portable terminal during sliding movement.
Figure 6:
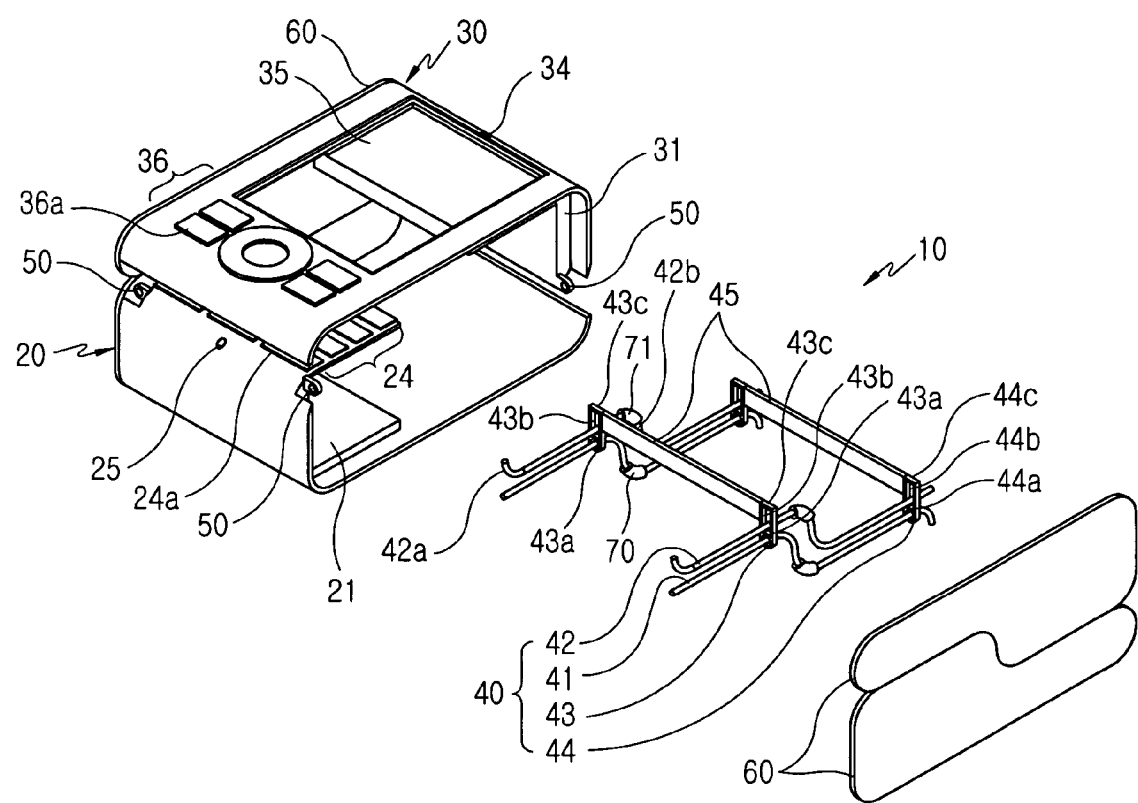
FIG. 6 is an exploded perspective view showing the construction of a sliding module for a sliding-type portable terminal according to a first embodiment of the present invention.
Figure 7:
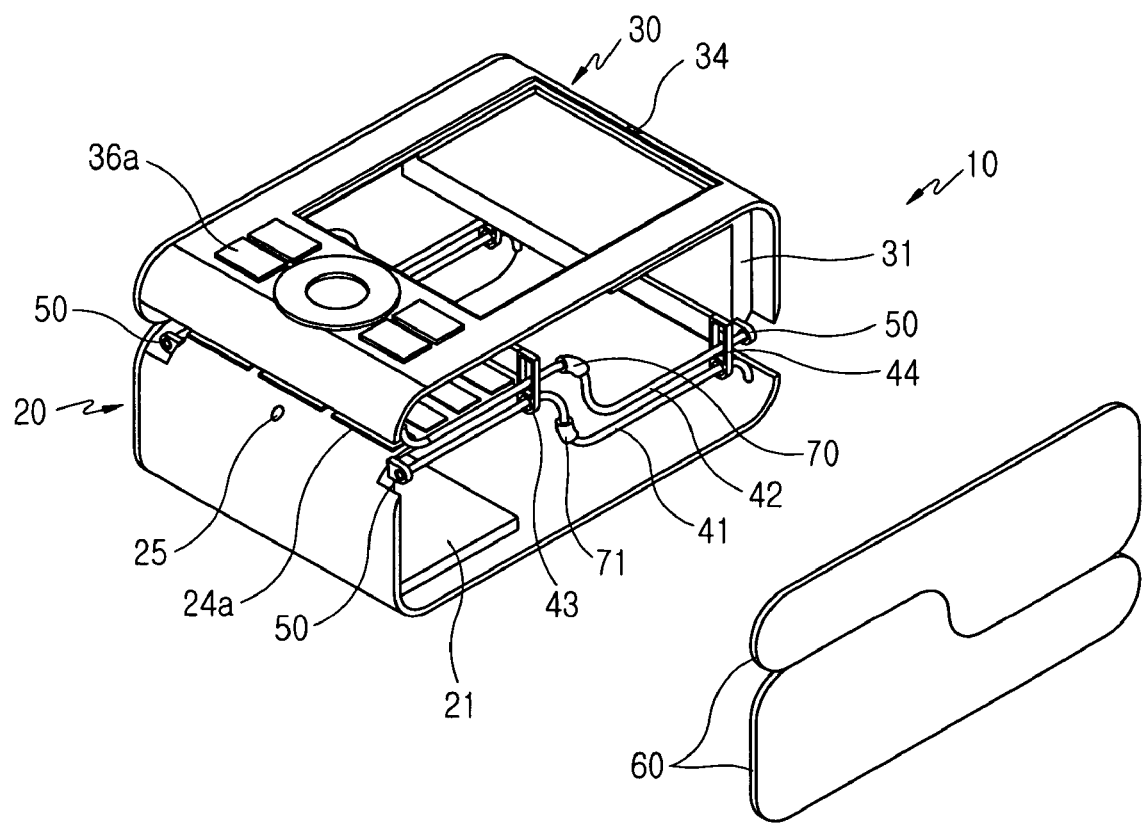
FIG. 7 is an assembled perspective view of the sliding module of FIG. 6.

As shown in FIGS. 6 and 7, a sliding module 10 for a sliding-type portable terminal according to a first embodiment of the present invention includes a main housing 20, a sliding housing 30, and a pair of sliding rail modules 40. The main housing 20 is coupled to the sliding housing 30 in such a manner that the sliding housing 30 moves, or slides, along the longitudinal direction of the main housing 20. Particularly, the sliding housing 30 slides along a curved path in a direction approaching or away from the main housing 20 along the longitudinal direction thereof to be arranged next to the main housing 20 along the longitudinal direction, with the sliding housing 30 on top of the main housing 20.

The pair of sliding rail modules 40 are positioned on both sides of the housings 20 and 30 to couple the sliding housing 30 to the main housing 20 in such a manner that the sliding housing 30 slides along the rail modules 40 which define a curved path along the longitudinal direction. The main and sliding housings 20 and 30 are arranged side by side, one on top of the other, exposing in the open position and hiding in the closed position, predetermined regions of the top surface of the housings 20 and 30.

As shown in FIG. 7, the housings 20 and 30 have at least one mounting groove 21 and 31 formed on both sides thereof, respectively, to mount the pair of sliding rail modules 40 thereon.

As shown in FIG. 6, the mounting grooves 21 and 31 have a pair of rail retainers 50 formed on an end thereof, to be fixed to, and retain an end of, the pair of sliding rail modules 40. At least one protection cover 60 is positioned thereon to protect the pair of sliding rail modules 40.

Figure 8:
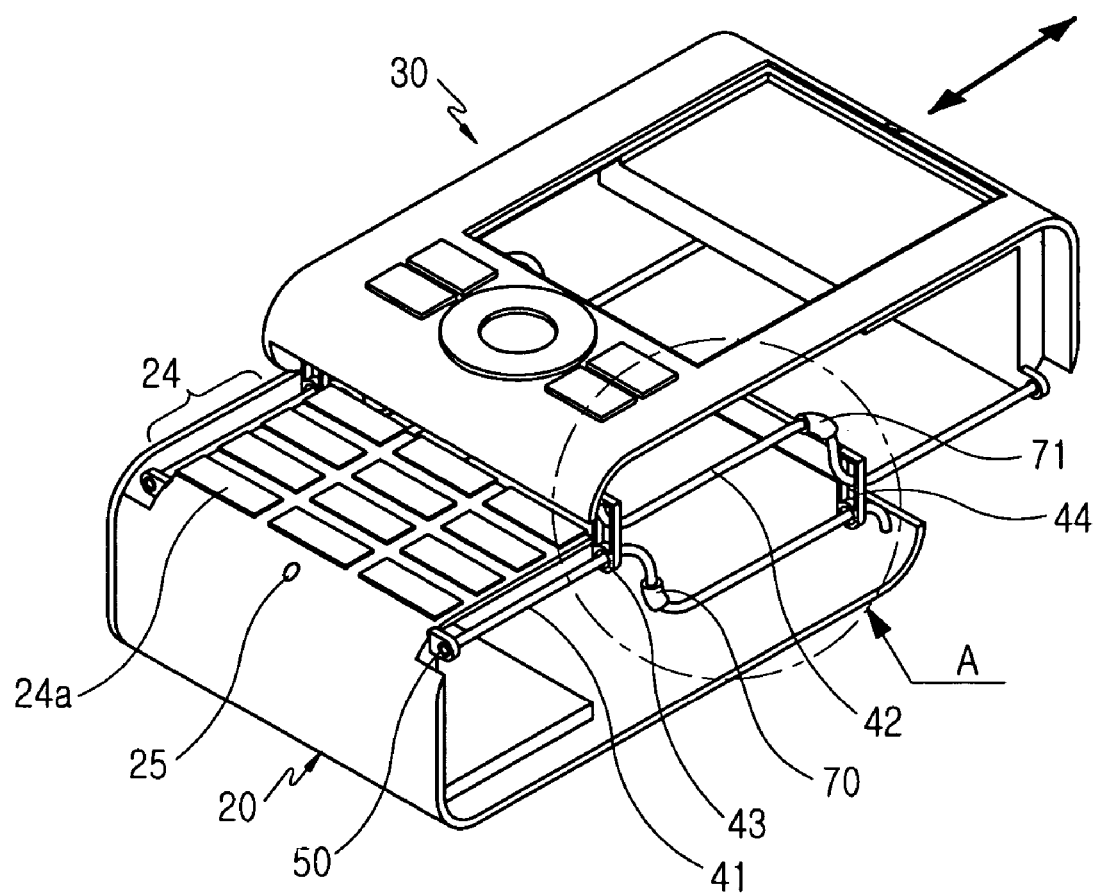
FIG. 8 is a perspective view of the sliding module of FIG. 7, prior to operation.
Figure 9:
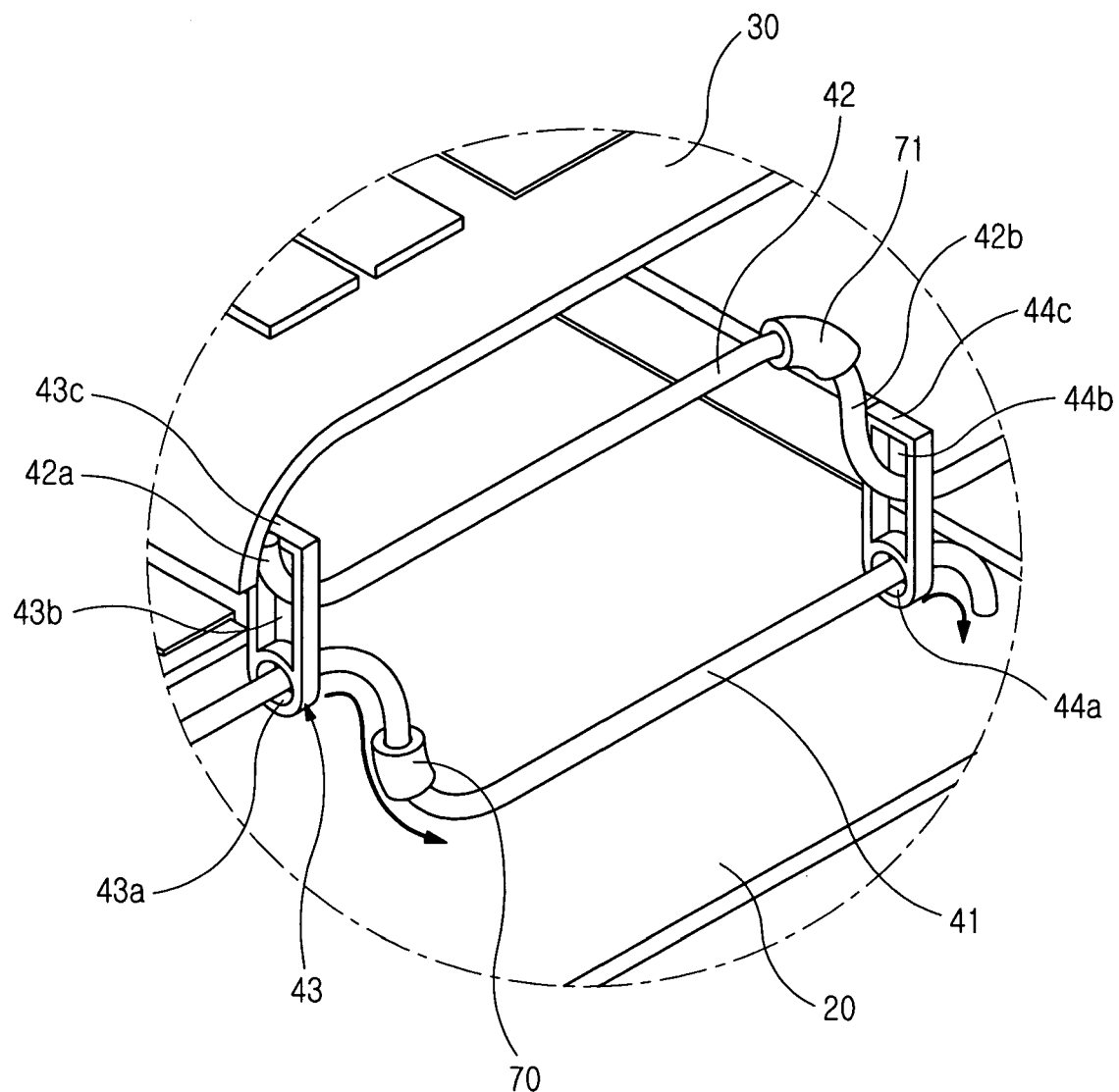
FIG. 9 is an enlarged perspective view of part A of FIG. 8.

As shown in FIGS. 6, 8, and 9, the pair of sliding rail modules 40 include a pair of first guide rails 41 and second guide rails 42, and a pair of first guide rail portion 43 and second rail guide portion 44. The first guide rails 41 are positioned on both ends of the main housing 20, defining a curved path in the longitudinal direction, and are retained in the mounting grooves 21 of the main housing 20 by the rail retainers 50. The second guide rails 42 are positioned on both ends of the sliding housing 30, defining a curved path in the longitudinal direction that corresponds to the first guide rails 41, and are retained in the mounting grooves 31 of the sliding housing 30 by the rail retainers 50. The first and second rail guide portions 43 and 44 extend through, and are coupled to, the first and second guide rails 41 and 42 to guide the sliding housing 30 along the path defined by the first and second guide rails 41 as the sliding housing 30 slides along the curve.

The first and second guide rails 41 and 42 are preferably constructed of wires coupled to the first and second rail retainers 50.

Figure 10:
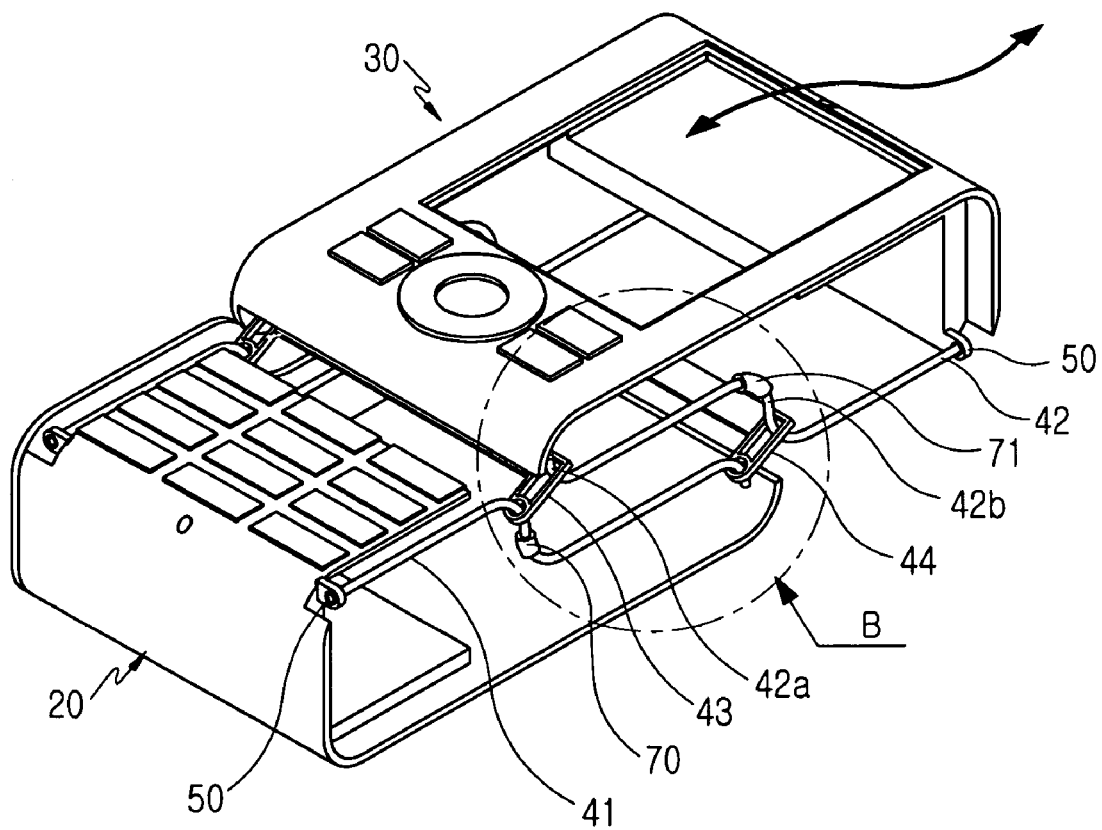
FIG. 10 is a perspective view of the sliding module of FIG. 8 during further operation.
Figure 11:
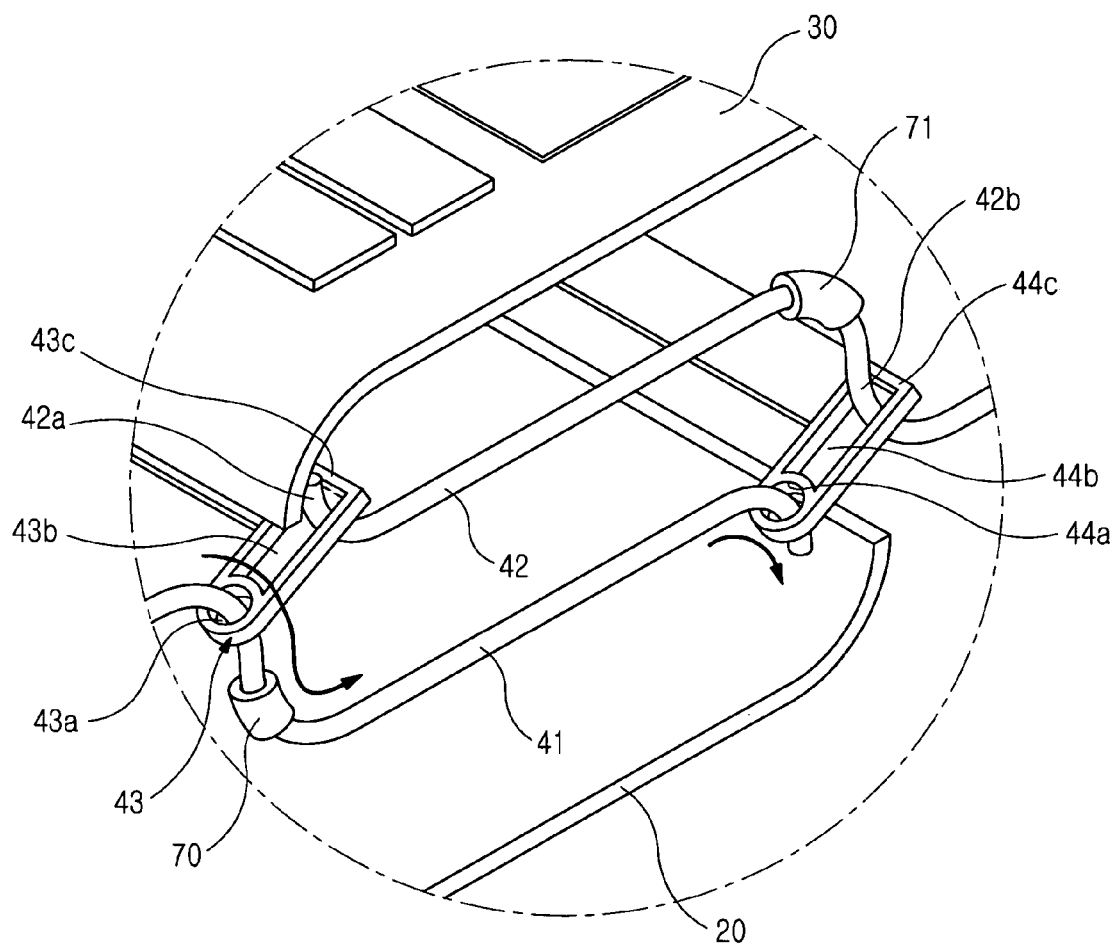
FIG. 11 is an enlarged perspective view of part B of FIG. 10.
Figure 12:
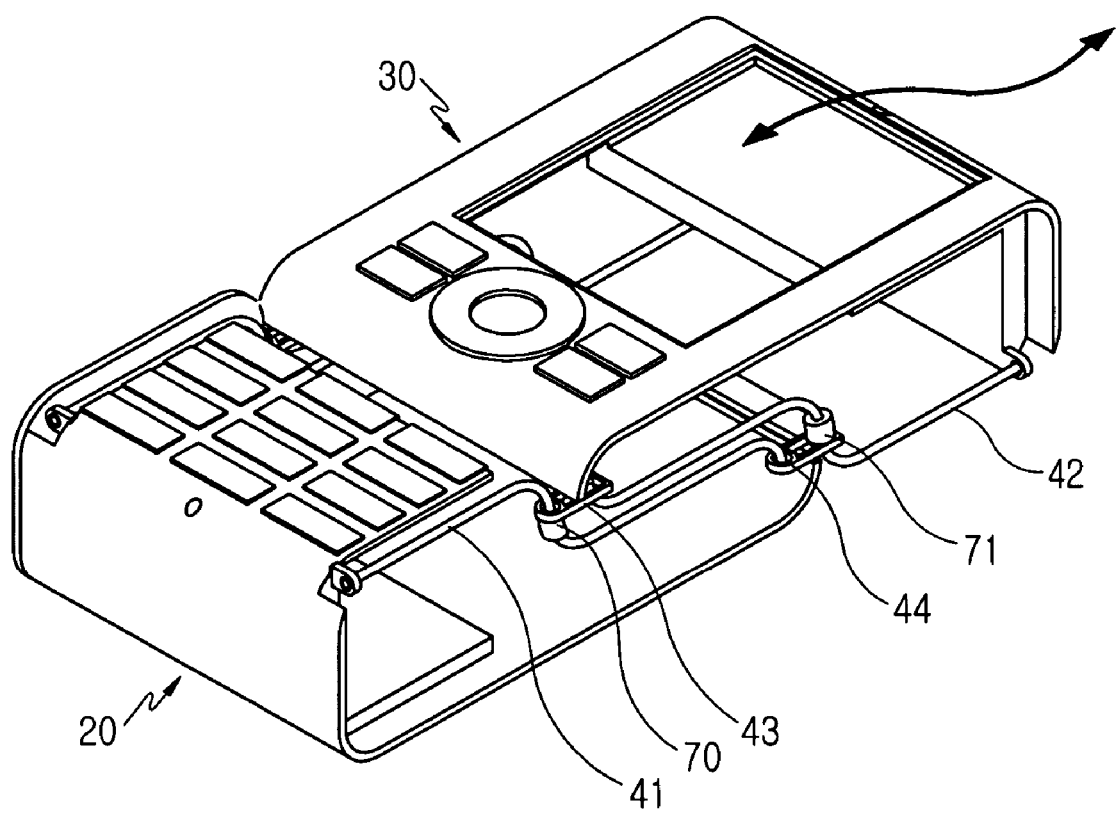
FIG. 12 is a perspective view showing a sliding module for a sliding-type portable terminal, after sliding movement, according to a first embodiment of the present invention.

As shown in FIGS. 10, 11, and 12, the first and second rail guide portions 43 and 44 each have at least one guide hole 43a and 44a formed therein so that they extend through, and are coupled to, the first guide rails 41 and guided to move along the curve of the first guide rails 41. Movement holes 43b and 44b are formed adjacent to the guide holes 43a and 44a to move along the second guide rails 42. The movement holes 43b and 44b have catching movement portions 43c and 44c formed on an end thereof to catch the first and second catching portions 42a and 42b of the second guide rails 42 when the sliding housing 30 slides along the curve, and to rotate the first and second rail guide portions 43 and 44 together along the curve of the first guide rails 41.

Figure 13:
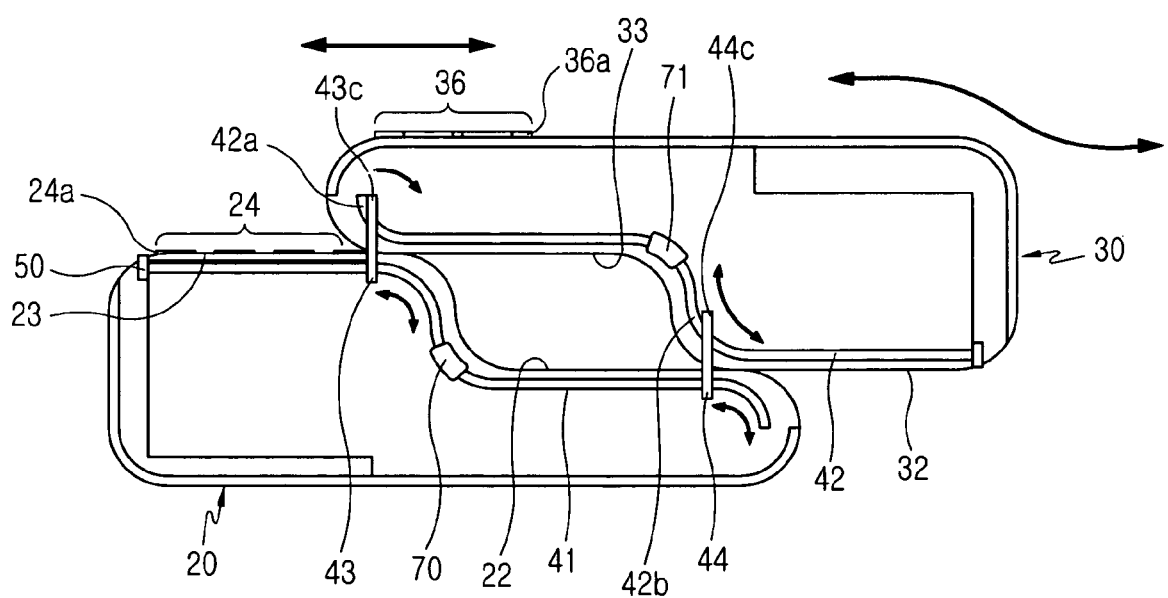
FIG. 13 is a side lateral view of a sliding-type portable terminal, prior to operation, according to a first embodiment of the present invention.
Figure 14:
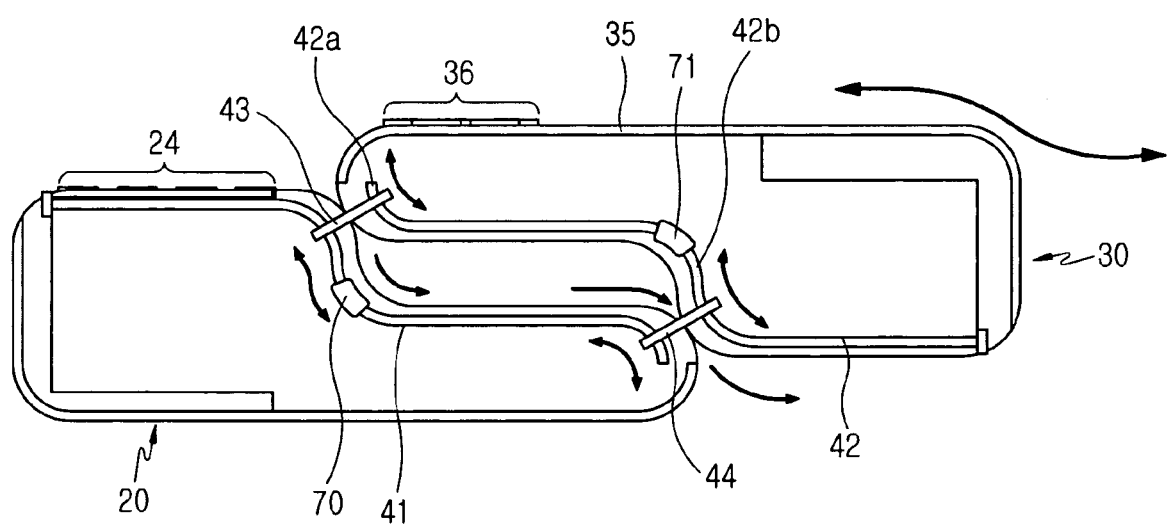
FIG. 14 is a side lateral view of the sliding-type portable terminal of FIG. 13, during operation.
Figure 15:
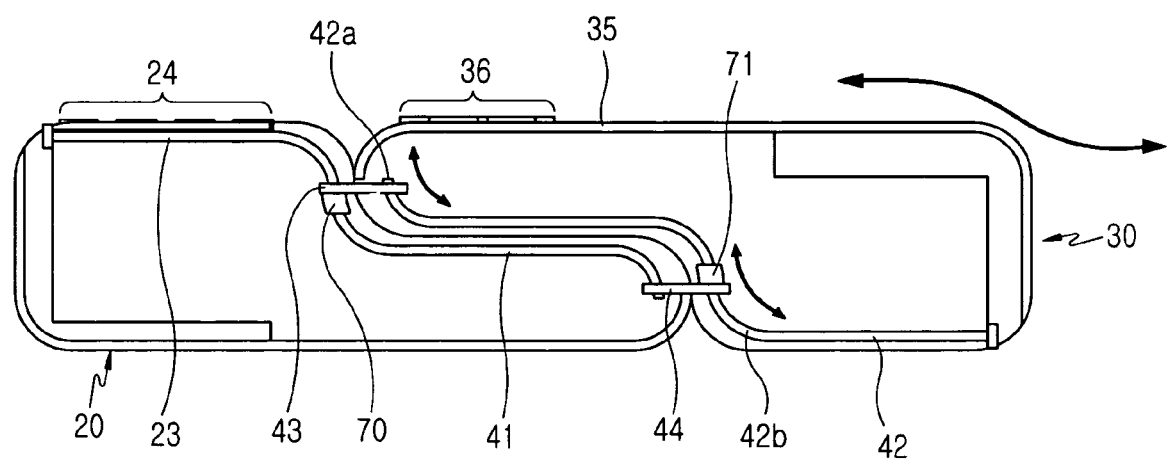
FIG. 15 is a side lateral view of the sliding-type portable terminal of FIG. 13, after operation.
Figure 16:
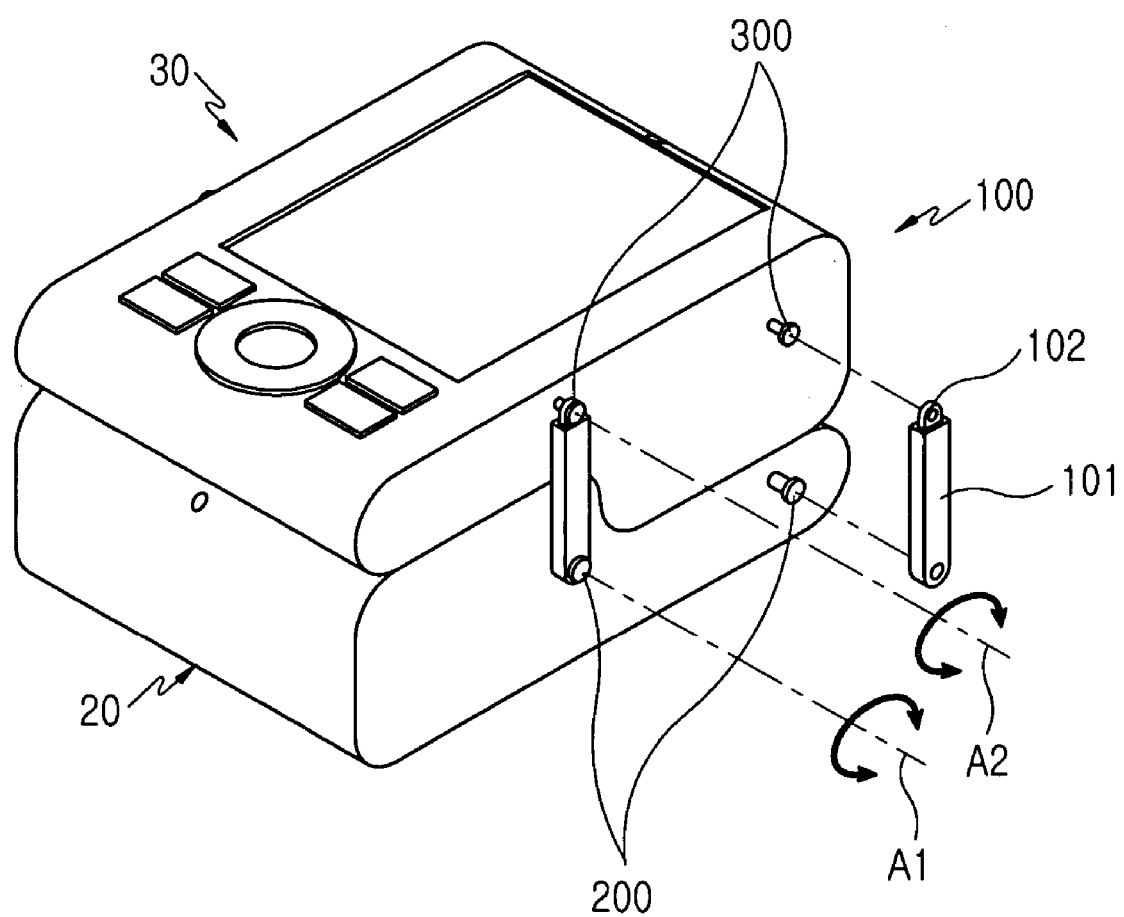
FIG. 16 is an exploded perspective view showing the construction of a sliding module for a sliding-type portable terminal according to a second embodiment of the present invention.

As shown in FIGS. 13, 14, and 15, the first and second guide rails 41 and 42 have first and second stopper portions 70 and 71 formed thereon which are adapted to contact the first and second rail guide portions 43 and 44, when the catching movement portions 43c and 44c of the first and second rail guide portions 43 and 44 rotate along the curve of the first and second guide rails 41 and 42, and stop them from rotating.

As shown in FIG. 6, at least one support member 45 is positioned between the first and second rail guide portions 43 and 44 to connect and support them.

As shown in FIG. 13, the second guide rails 42 have first and second catching portions 42a and 42b formed thereon to catch the curved movement stopper portions 43c and 44c of the first and second rail guide portions 43 and 44 so that the first and second catching portions 42a and 42b rotate together.

As shown in FIGS. 13, 14, and 15, the main housing 20 has a first region 22 recessed a predetermined distance from the upper surface thereof to be coupled to, and separated from, the first coupling region 32 (described later) of the sliding housing 30 as it slides along a curve, and a second region 23 positioned adjacent to the first region 22 that protrudes a predetermined height from the first region 23 to be coupled to the second coupling region 33 (described later) of the sliding housing 30. The second region 23 is provided with, on its upper surface, a microphone device 25 and a first key array 24 made up of a number of keys 24a arranged to be exposed when opened, and hidden by the sliding housing 30 when closed as it slides along a curve in the longitudinal direction defined by the first and second guide rails 41 and 42.

As shown in FIG. 13, the sliding housing 30 has a first coupling region 32 formed on the rear surface thereof to be coupled to, and separated from, the first region 22, and a second coupling region 33 recessed a predetermined depth (creating a difference in level with the first coupling region) and positioned adjacently to the first coupling region 32 to be coupled to, and separated from, the second region 23.

The sliding housing 30 is provided with, on its upper surface, a speaker device 34, a large LCD 35 positioned adjacently to the speaker device 34, and a second key array 36 made up of a number of keys 36a arranged adjacently to the large LCD 35.

The operation of the sliding module for a sliding-type portable terminal according to the first embodiment of the present invention, configured as above, will now be described in more detail with reference to FIGS. 6 to 15.

As shown in FIGS. 6 and 7, the mounting grooves 21 and 31 are formed on both sides of the main and sliding housings 20 and 30 and the pair of sliding rail modules 40 are positioned in the mounting grooves 21 and 31.

As shown in FIGS. 8 and 9, the sliding housing 30 is slid along the longitudinal direction of the main housing 20.

As shown in FIGS. 10 and 11, the second guide rails 42 mounted in the mounting grooves 31 of the sliding housing 30 slide together with the sliding housing 30 and the first catching portions 42a formed on the second guide rails 42 catch the catching movement portions 43c formed on the first rail guide portions 43.

As shown in FIG. 13, the second catching portions 42b formed on the second guide rails 42 are moved together and catch the catching movement portions 44c formed on the second rail guide portions 44.

As shown in FIG. 14, the first and second rail guide portions 43 and 44 have the guide holes 43a and 44a formed thereon in such a manner that the first guide rails 41 extend through the guide holes 43a and 44a, and are coupled thereto. The guide holes 43a and 44a are then guided along the curve of the first guide rails 41.

As shown in FIGS. 12 and 15, the first and second rail guide portions 43 and 44 rotate along the curve defined by the first guide rails 41 while the sliding housing 30 moves along the curved path defined by the first guide rails 41.

The first and second stopper portions 70 and 71 formed on the first and second guide rails 41 and 42 contact the first and second rail guide portions 43 and 44 to stop the rail guide portions 43 and 44 from rotating.

The first and second stopper portions 70 and 71 retain the main and sliding housings 20 and 30 after they are positioned side by side and prevent them from floating, or moving, when the terminal is in use.

The first and second guide rails 41 and 42 are preferably made of wires so that the guide holes 43a and 44a of the first and second rail guide portions 43 and 44 can move.

As shown in FIGS. 12 and 15, when fully opened, the second region 23 of the main housing 20 is exposed and the microphone device 25 and the first key array 24 are arranged next to the speaker device 34, the large LCD 35, and the second key array 36. All are positioned on the upper surface of the sliding housing 30.

The first and second key arrays 24 and 36 are made up of a number of keys 24a and 36a.

As shown in FIGS. 13 and 14, the sliding housing 30 has the first coupling region 32 formed on the rear surface thereto to be coupled to, and separated from, the first region 22 of the main housing 20. The first coupling region 32 is separated from the first region 22 as the sliding housing 30 slides along the curved path defined by the guide rails 41 and 42.

The second coupling region 33, which is formed adjacent to the first coupling region 32, is separated from the second coupling region 23.

When the sliding housing 30 is slid in a direction approaching the main housing 20 as shown in FIGS. 7 and 13, the first and second rail guide portions 43 and 44 are guided along the curve of the second guide rails 42 in the direction opposite to the longitudinal direction so that the sliding housing 30 slides along the curved path to the original position. As shown in FIG. 7, the first and second coupling regions 32 and 33 of the sliding housing 30 are again coupled to the first and second regions 22 and 23 of the main housing 20. In this configuration, the first key array 24 is hidden.

As mentioned above, the sliding-type portable terminal has a pair of sliding rail modules for easy sliding opening/closing operation of the terminal; the housings are positioned side by side for easy use of the keys on the terminal; and the thickness of the terminal is reduced for slimness.

The operation of a sliding-type portable terminal according to a second embodiment of the present invention, configured as above, will now be described in more detail with reference to FIGS. 16 to 22.

As shown in FIGS. 16 to 19, the sliding module for a sliding-type portable terminal includes a number of variable sliding modules 100.

The variable sliding modules 100 are positioned on both sides of the main housing 20 and the sliding housing 30 to couple the sliding housing 30 to the main housing 20 in such a manner that the sliding housing 30 can slide from the main housing 20 along a curved path in the longitudinal direction. As the sliding housing 30 slides upwardly, it moves along a curved path, and organically rotates about first and second hinge axes A1 and A2, traveling a predetermined distance L1, so that the upper surfaces of the housing 20 and 30 are exposed when opened and hidden when closed.

Figure 17:
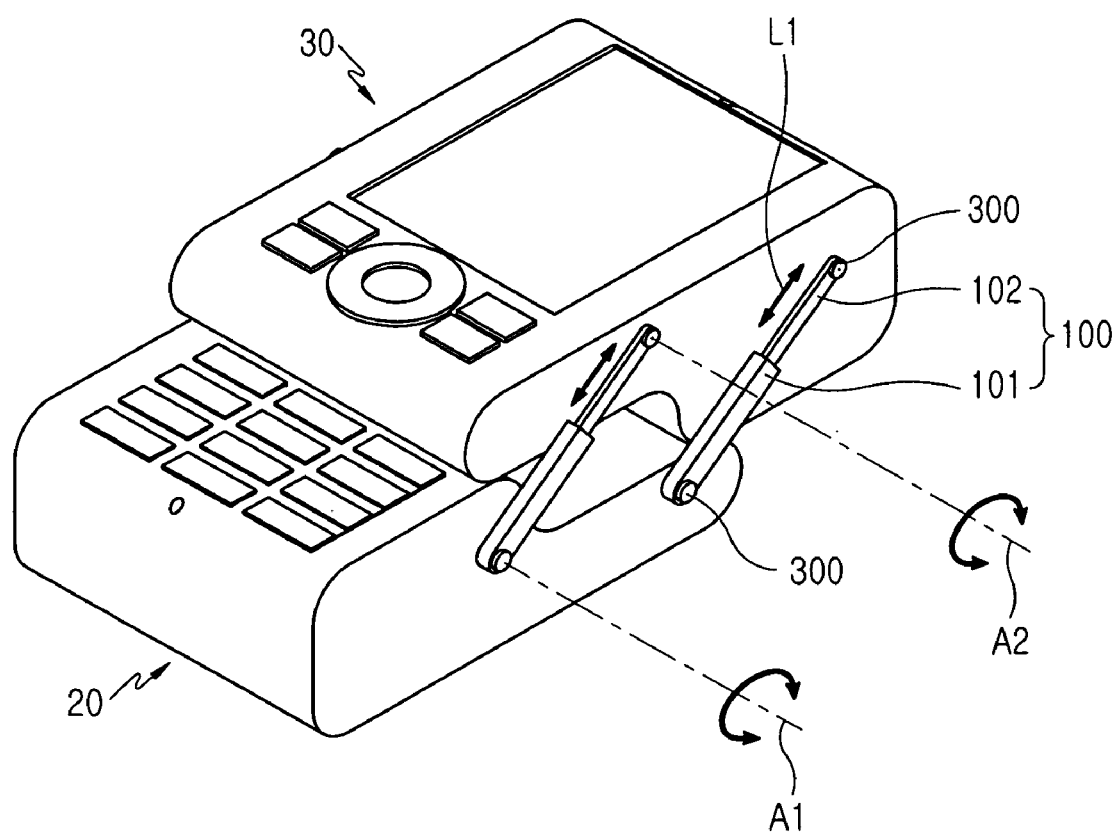
FIG. 17 is a perspective view showing a sliding module for a sliding-type portable terminal of FIG. 16, during operation.
Figure 18:
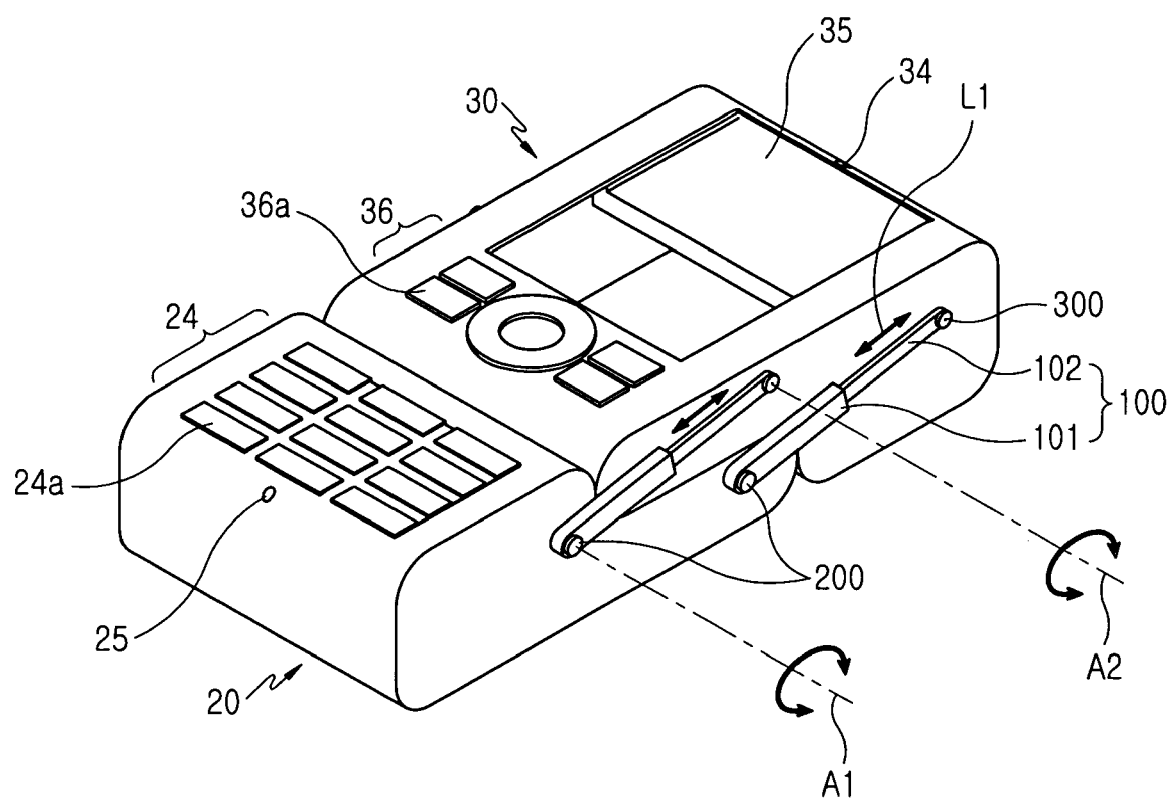
FIG. 18 is a perspective view showing a sliding module for a sliding-type portable terminal of FIG. 17, after operation.

Rotation housings 101 are rotatably coupled to both sides of the main housing 20 to allow the sliding housing to slide upwardly along a curved path in the longitudinal direction as shown in FIGS. 17 and 18. The sliding housing 30 moves upwardly along a straight path in front of the main housing 20, until the sliding housing 30 reaches the top of the main housing 20. At this point, the sliding housing 30 moves down from the original upward sliding movement, toward, and closer to the main housing 20, until the front and back of the main housing 20 is flush with the front and back of the sliding housing 30.

Figure 20:
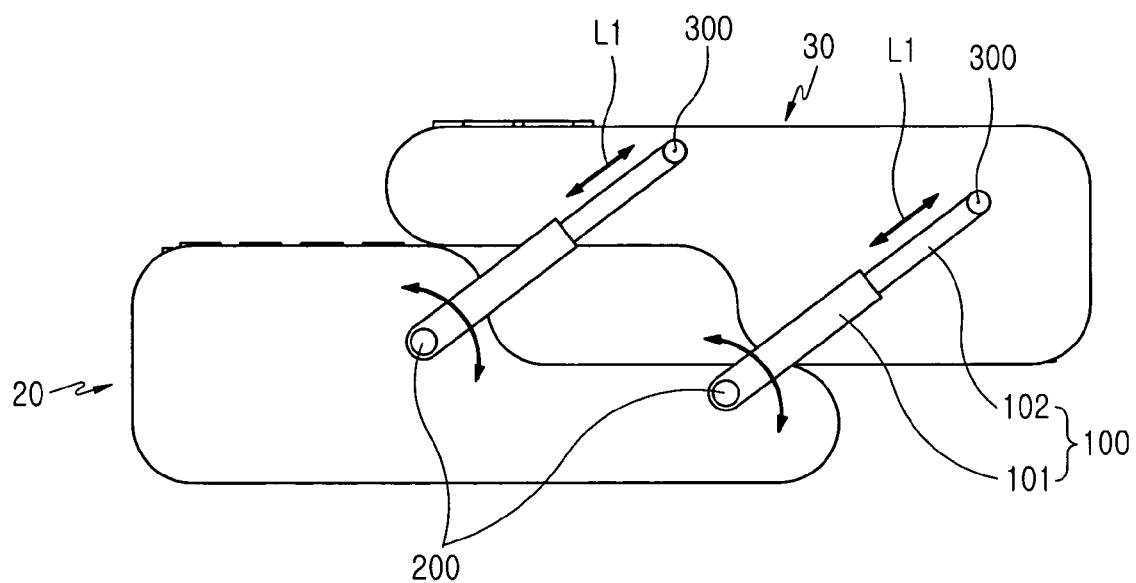
FIG. 20 is a side lateral view of the sliding-type portable terminal of FIG. 17 during operation.

As shown in FIGS. 17 and 20, the main housing 20 has first hinge portions 200 formed on both sides thereof to slidably and rotatably couple the main housing 20 to the rotation housings 101, which rotate about the first hinge axis A1.

As shown in FIG. 20, variable members 102 are inserted into openings formed on the rotation housings 101. As the sliding housing 30 slides, the variable members 102 travel a predetermined distance L1, corresponding to the sliding distance of the sliding housing 30.

AS shown in FIG. 17, the sliding housing 30 has second hinge portions 300 positioned on both sides thereof to slidably and rotatably couple the sliding housing 30 to the variable members 102 for rotation about the second hinge axis A2.

Figure 21:
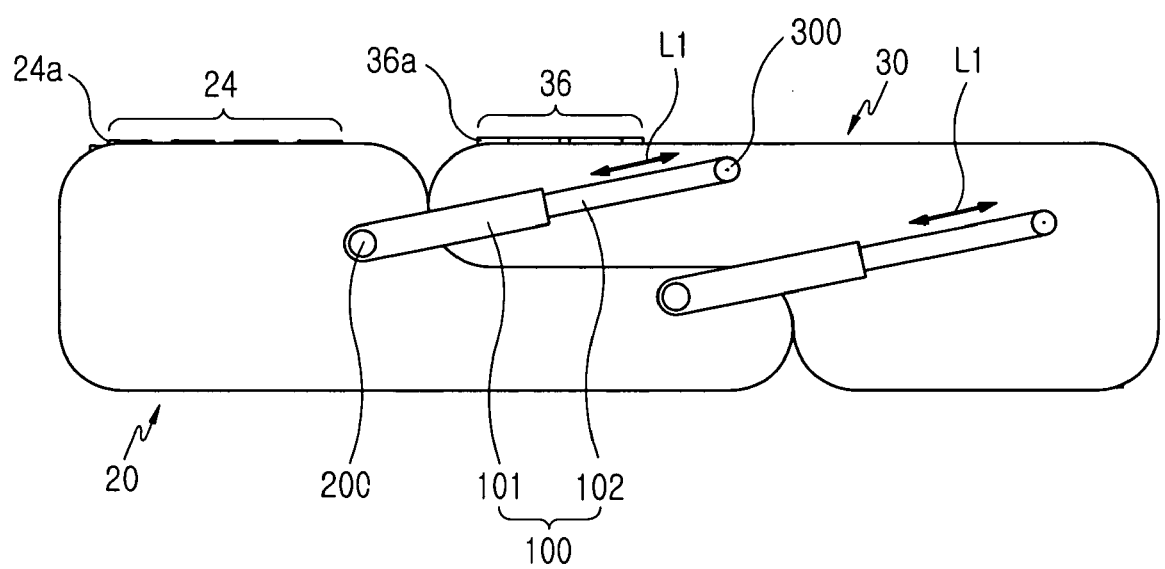
FIG. 21 is a side lateral view of the sliding-type portable terminal of FIG. 18 after operation.

When the sliding housing 30 slides upwardly and along the curved path as shown in FIGS. 18 and 21, the first and second hinge portions 200 and 300 rotate simultaneously so that the top surfaces of the main and sliding housings 20 and 30 are arranged side by side.

Figure 22:
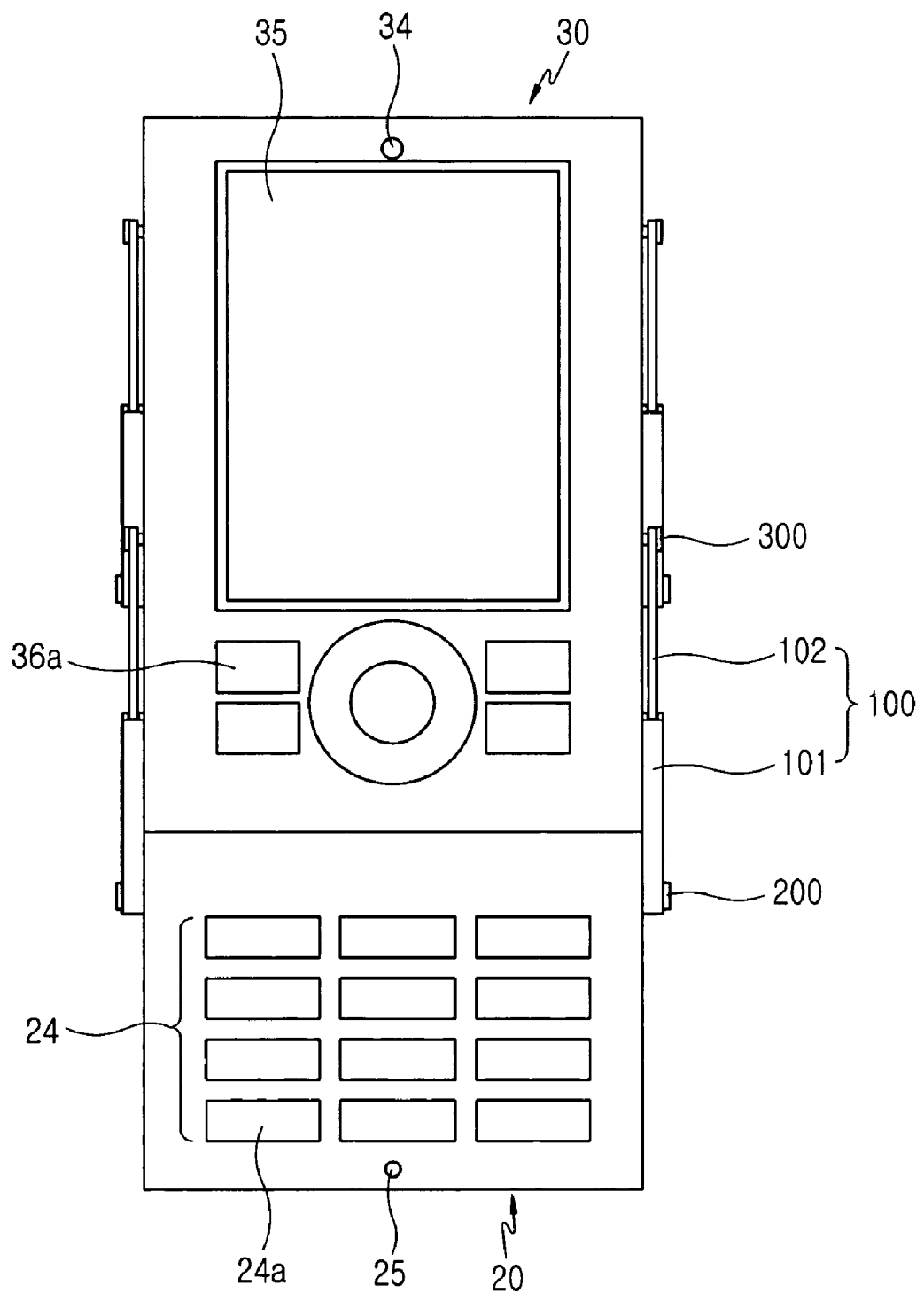
FIG. 22 is a top view of the sliding-type portable terminal after operation, of FIG. 21.

As shown in FIG. 22, the main housing 20 has a microphone device 25 and a first key array 24 positioned on the upper surface thereof. The sliding housing 30 has a speaker device 34, a large LCD 35, and a second key array 36 positioned on the upper surface thereof.

When the sliding housing 30 is slid downwardly along the longitudinal direction as shown in FIGS. 17 and 20, the variable members 102 travel a predetermined distance L1 into the rotation housings 101.

As shown in FIG. 20, the variable members 102 and the rotation housings 101 organically rotate about the first and second hinge axes A1 and A2.

Figure 19:
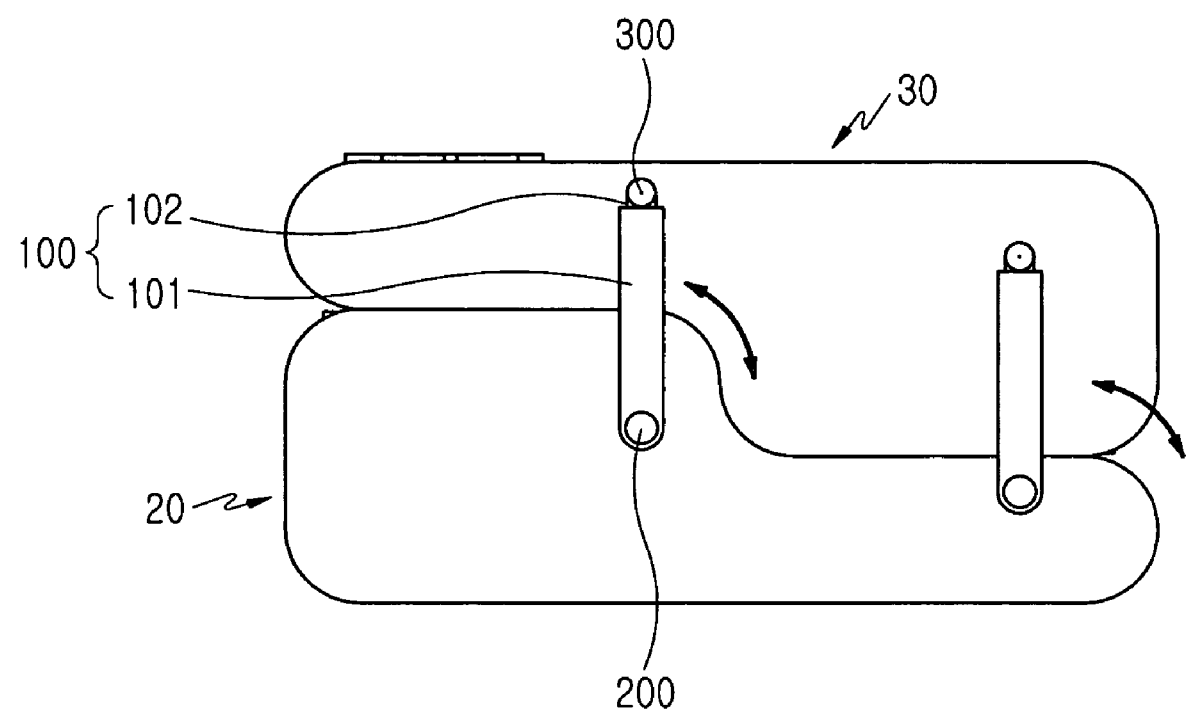
FIG. 19 is a side lateral view of the sliding-type portable terminal of FIG. 16 prior to operation.

As shown in FIG. 19, the sliding housing 30 travels to the original position along the curved path, perpendicular to the longitudinal direction.

As mentioned above, the sliding-type portable terminal has a number of variable sliding modules 100 for easy sliding opening/closing operation of the terminal, the housings are positioned side by side on the same line for easy use of the keys on the terminal, and the thickness of the terminal is reduced for slimness.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding module for a sliding-type portable terminal comprising:
    a main housing extending along a longitudinal direction;
    a sliding housing adapted to slide along a curve in the longitudinal direction toward or away from the main housing; and
    a pair of sliding rail modules positioned on each side of the housings to couple the sliding housing to the main housing in such a manner that the sliding housing can slide with respect to the main housing along a curve in the longitudinal direction.

2. A sliding module for a sliding-type portable terminal as claimed in claim 1, wherein each housing has at least one mounting groove formed on both sides thereof to mount the pair of sliding rail modules therein.

3. A sliding module for a sliding-type portable terminal as claimed in claim 2, wherein the mounting groove has a pair of rail retainers formed on an end thereof to be coupled to and retain an end of the pair of Sliding rail modules.

4. A sliding module for a sliding-type portable terminal as claimed in claim 2, wherein the mounting groove has at least one cover to protect the pair of sliding rail modules.

5. A sliding module for a sliding-type portable terminal as claimed in claim 1, wherein the pair of sliding rail modules comprise:
    a pair of first guide rails mounted in a mounting groove of the main housing and extending along a curve in the longitudinal direction;
    a pair of second guide rails mounted in a mounting groove of the sliding housing and extending along a curve in the longitudinal direction while corresponding to the first guide rails; and
    a pair of first and second rail guide portions which extend through and are coupled to the first and second guide rails and which are guided along the curve of the second guide rails simultaneously as the sliding housing slides along the curve.

6. A sliding module for a sliding-type portable terminal as claimed in claim 5, wherein the first and second guide rails comprise wires.

7. A sliding module for a sliding-type portable terminal as claimed in claim 5, wherein the first and second rail guide portions have at least one guide hole formed therein so that they extend through and are coupled to the first guide rails and are guided to move along the curve of the first guide rails, a movement hole is formed adjacent to the guide hole to move the second guide rails, and the movement hole has a catching movement portion formed on an end thereof to catch a catching portion of the second guide rails when the sliding housing slides along the curve and to rotate the first and second rail guide portions together along the curve of the first guide rails.

8. A sliding module for a sliding-type portable terminal as claimed in claim 7, wherein the first and second guide rails have first and second stopper portions formed thereon to contact the first and second rail guide portions as the catching movement portions of the first and second rail guide portions rotate along the curve of the first and second guide rails and to stop them from rotating.

9. A sliding module for a sliding-type portable terminal as claimed in claim 5, further comprising at least one support member positioned between the first and second rail guide portions to support them.

10. A sliding module for a sliding-type portable terminal as claimed in claim 5, wherein the second guide rails have first and second catching portions formed thereon in a curved shape to catch catching movement portions of the first and second rail guide portions, the first catching portions are adapted to catch the catching movement portions of the first rail guide portions and rotate along a curve, and the second catching portions are adapted to catch curved movement stoppers of the second rail guide portions and rotate along a curve.

11. A sliding module for a sliding-type portable terminal as claimed in claim 10, wherein the main housing has a first recessed region and a second region positioned adjacent to the first recessed region, the second region protruding a predetermined height relative to the first recessed region.

12. A sliding module for a sliding-type portable terminal as claimed in claim 11, wherein the second region is provided with, on its upper surface, a microphone device and a first key array made up of a number of keys arranged to be exposed and hidden as the sliding housing slides along a curve in the longitudinal direction.

13. A sliding module for a sliding-type portable terminal as claimed in claim 11, wherein the sliding housing has a first coupling region formed on the rear surface thereof to be coupled to and separated from the first region and a second coupling region positioned adjacently to the first coupling region while being recessed a predetermined depth relative to the first coupling region to be coupled to and separated from the second region.

14. A sliding module for a sliding-type portable terminal as claimed in claim 11, wherein, when the sliding housing is slid away from the main housing along the longitudinal direction, the first and second catching portions of the second guide rails catch the catching movement portions of the first and second rail guide portions and cause the rail guide portions to slide along the curve of the first guide rails; wherein after the sliding, the stopper portions stop the second guide rails, and the second region of the main housing is arranged next to an upper surface of the sliding housing; and wherein, when the sliding housing is slid toward the main housing along the longitudinal direction, the first and second catching portions of the second guide rails catch the movement stopper portions and the first and second rail guide portions are guided along the curved first and second guide rails to their original position in the opposite direction to the longitudinal direction.

15. A sliding module for a sliding-type portable terminal as claimed in claim 5, wherein the first guide rails are shorter than the second guide rails.

16. A sliding module for a sliding-type portable terminal as claimed in claim 1, wherein the sliding housing is provided with, on its upper surface, a speaker device, a large LCD positioned adjacent to the speaker device, and a second key array made up of a number of keys arranged adjacent to the large LCD.

17. A sliding module for a sliding-type portable terminal as claimed in claim 1, wherein a pair of sliding rail modules are to expose and hide predetermined regions of the upper surfaces of the housing.

18. A sliding module for a sliding-type portable terminal comprising: a main housing extending along a longitudinal direction;
a sliding housing adapted to slide along a curve in the longitudinal direction toward or away from the main housing; and
a plurality of sliding modules positioned on both sides of the housings to couple the sliding housing to the main housing in such a manner that the sliding housing can slide with respect to the main housing along a curve in the longitudinal direction and adapted to simultaneously rotate about a number of hinge axes according to sliding a predetermined length so that the upper surfaces of the housings are exposed and hidden.

19. A sliding module for a sliding-type portable terminal as claimed in claim 18, wherein the variable sliding modules comprise:
a number of rotation housings having an opening formed on an end thereof with another end being rotatably coupled to both sides of the main housing to rotate a predetermined angle; and
variable members adapted to travel a predetermined length so that they can be inserted into and released from the openings of the rotation housings with an end thereof being rotatably coupled to both sides of the sliding housing.

20. A sliding module for a sliding-type portable terminal as claimed in claim 19, wherein the main housing has first hinge portions positioned on both sides thereof to provide a first hinge axis and to rotatably couple the main housing to the rotation housing and the sliding housing has second hinge portions positioned on both sides thereof to provide a second hinge axis and rotatably couple the sliding housing to the variable members.

21. A sliding module for a sliding-type portable terminal as claimed in claim 19, wherein the rotation housing and the variable members are of a bar type.

22. A sliding-type portable terminal comprising:
a main housing extending along a longitudinal direction; and
a sliding housing coupled to the main housing in such a manner that it can slide along a curve in the longitudinal direction toward or away from the main housing and, as it slides, an upper surface thereof can be arranged at the same level with an upper surface of the main housing.

23. A sliding-type portable terminal as claimed in claim 22, wherein the main housing is provided with, on its upper surface, a microphone device and a first key array made up of a number of keys arranged to be exposed and hidden next to the upper surface of the sliding housing on a same line as the sliding housing slides along a curve in the longitudinal direction.

24. A sliding-type portable terminal as claimed in claim 22, wherein the sliding housing is provided with, on its upper surface, a speaker device, a large LCD positioned adjacent to the speaker device, and a second key array made up of a number of keys arranged adjacent to the large LCD.

* * * * *